(12) United States Patent
Kellerman et al.

(10) Patent No.: US 11,398,720 B2
(45) Date of Patent: Jul. 26, 2022

(54) FLEX-FITTING CABLE TRAY

(71) Applicants: Cablofil, Inc., Mascoutah, IL (US); Legrand France, Limoges (FR); Legrand SNC, Limoges (FR)

(72) Inventors: Dallas Kellerman, Belleville, IL (US); Robert Crain, Caseyville, IL (US); Zachary Bridgeman, O'Fallon, IL (US); Alain Jadaud, Tennie (FR); Damien Adam, Domfront en Champagne (FR)

(73) Assignees: Cablofil, Inc., Mascoutah, IL (US); Legrand France, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 17/217,581

(22) Filed: Mar. 30, 2021

(65) Prior Publication Data
US 2021/0313785 A1 Oct. 7, 2021

Related U.S. Application Data

(63) Continuation-in-part of application No. 16/837,049, filed on Apr. 1, 2020.

(51) Int. Cl.
*H02G 3/00* (2006.01)
*H02G 3/06* (2006.01)
*H02G 3/04* (2006.01)

(52) U.S. Cl.
CPC ......... *H02G 3/0608* (2013.01); *H02G 3/0443* (2013.01)

(58) Field of Classification Search
None
See application file for complete search history.

(56) References Cited

U.S. PATENT DOCUMENTS

| | | | | |
|---|---|---|---|---|
| 6,061,884 A | * | 5/2000 | Ohms | H02G 3/0443 24/703.1 |
| 6,193,434 B1 | * | 2/2001 | Durin | H02G 3/0608 403/309 |
| 6,637,704 B2 | | 10/2003 | Jette | |
| 7,462,785 B1 | * | 12/2008 | Davis | H02G 3/0443 403/329 |
| 8,250,717 B2 | * | 8/2012 | Boone | H01R 4/2408 24/514 |

(Continued)

FOREIGN PATENT DOCUMENTS

| | | |
|---|---|---|
| DE | 7120422 | 8/1971 |
| DE | 7539058 | 4/1976 |

(Continued)

*Primary Examiner* — Steven M Marsh
(74) *Attorney, Agent, or Firm* — Bryan Cave Leighton Paisner LLP

(57) ABSTRACT

A cable tray system including two or more cable tray sections comprising a first side rail and a second side rail arranged substantially parallel to one another and a floor extending between. The tray system also includes one or more flex-wires for joining the cable tray sections, where the flex-wires can be U- or loop-shaped. Upon exerting tension on the flex-wires, the first and second cable tray sections can move away from one another from a first position to a second position. In addition, the tray system includes a fastening device that removably locks the tray system into the second position.

15 Claims, 10 Drawing Sheets

(56) References Cited

U.S. PATENT DOCUMENTS

| | | | |
|---|---|---|---|
| 2005/0040295 A1* | 2/2005 | Sinkoff | H02G 3/0608 |
| | | | 248/58 |
| 2014/0151513 A1* | 6/2014 | Valdes Colina | H02G 3/0443 |
| | | | 248/49 |
| 2017/0271855 A1* | 9/2017 | Valdes Colina | F16B 5/06 |
| 2018/0309275 A1 | 10/2018 | Winn | |
| 2021/0126440 A1* | 4/2021 | Valdés Colina | H02G 3/0443 |
| 2021/0126441 A1* | 4/2021 | Valdés Colina | H02G 3/0443 |

FOREIGN PATENT DOCUMENTS

| | | |
|---|---|---|
| EP | 3166190 | 5/2017 |
| FR | 2853464 | 10/2004 |

\* cited by examiner

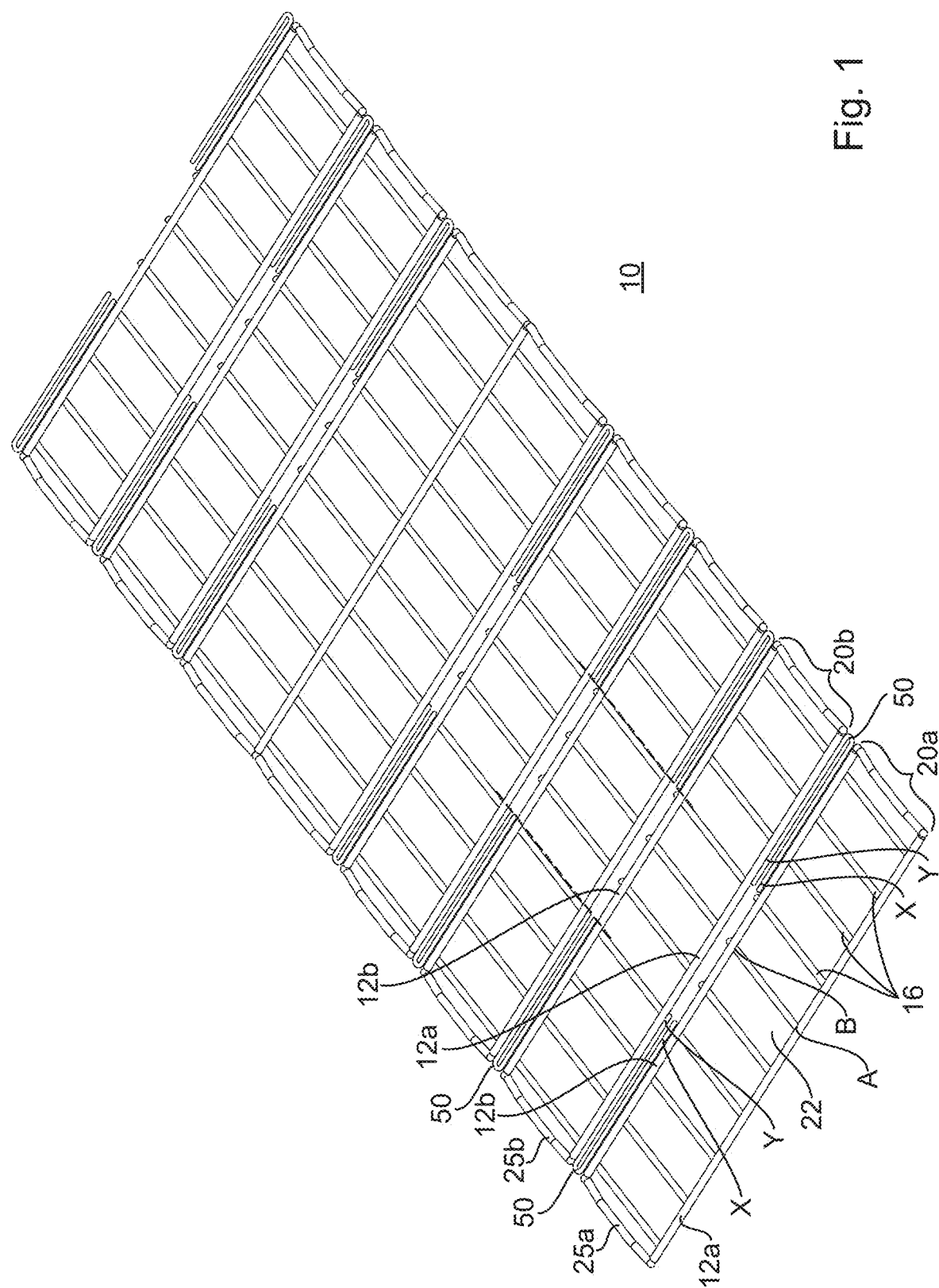

FLEX-FITTING CABLE TRAY

BACKGROUND

The present disclosure relates to cable tray systems for use with electrical and other cable and wiring systems.

Cable trays are used to support cables, electrical wires and the like which run through, over, and around buildings. Cable trays may have both straight and curved (horizontal and/or vertical) sections to accommodate the installation requirements of particular settings. There is a need for straight and curved sections to have flexibility to accommodate even more installation requirements.

SUMMARY OF THE DISCLOSURE

One aspect of the disclosure is directed to a cable tray system comprising two or more rigid cable tray sections coupled by one or more flex-wires. In some embodiments the cable tray system further comprises a removable fastening device coupled to the two or more cable tray sections to minimize flexibility of the two or more cable tray sections, relative to one another, when coupled. In some embodiments, one or more cable tray sections, each cable tray section comprising a first side rail and a second side rail arranged substantially parallel to one another and a floor extending between and connecting the first and second side rails. The cable tray system also comprises one or more flex-wires for coupling joining the cable tray sections. In some embodiments, the flex-wire can be a U-shaped flex-wire extending a length, L, wherein a first leg of the U-shaped flex-wire is coupled to a first cable tray section and wherein a second leg of the U-shaped flex-wire is coupled to a second cable tray section. In other embodiments, the flex-wire is a loop-shaped flex-wire, wherein a first side of the loop-shaped flex-wire is coupled to a first cable tray section and wherein a second side of the loop-shaped flex-wire is coupled to a second cable tray section. In other embodiments, the flex-wire can be shaped in other manners, including, but not limited to a V or W shape. The cable tray system is configured such that upon exerting tension on the flex-wires, the first and second cable tray sections move away from one another from a first position to a second position.

In some embodiments, the cable tray system further comprises a removable fastening device that locks the tray system into the second position. In other embodiments, the first leg of the U-shaped flex-wire is coupled to a first cable tray section by one of a weld or a looped end of the first leg and wherein a second leg of the U-shaped flex-wire is coupled to a second cable tray section by one of a weld or a looped end of the second leg. In other embodiments, the first leg of the loop-shaped flex-wire is coupled to a first cable tray section by one of a weld or a looped portion of the first leg and wherein a second leg of the loop-shaped flex-wire is coupled to a second cable tray section by one of a weld or a looped portion of the second leg.

In some embodiments, each cable tray section has one or more sidewalls extending vertically upward or downward from, and generally perpendicularly to, the floor of the cable tray section. Similarly, each flex-wire for joining the cable tray sections is bent in an "L" shape that approximately matches the "L" shape of the bend of the sidewalls from the floor of the cable tray section. In other embodiments, the ends of the flex-wires may be bent at other angles less than, or greater than 90 degrees. For example, in some embodiments, the legs of the flex-wires can be bent at approximately 45 degree angles.

In some embodiments, upon exerting tension on the flex-wire, the first cable tray section moves away from the second cable tray section from a first position to a second position in one of a substantially upwards, downwards or radial direction. That is, the flex-wires comprise a material that is both rigid and bendable. Similarly, in other embodiments, upon exerting tension on the flex-wire, the first cable tray section moves away from the second cable tray section from a first position to a second position in two of a substantially upwards, downwards or radial direction.

BRIEF DESCRIPTION OF THE FIGURES

These and other features, aspects and advantages of the disclosure will become more fully apparent from the following detailed description, appended claims, and accompanying drawings, wherein the drawings illustrate features in accordance with exemplary aspects of the disclosure, and wherein:

FIG. 1 is a top level perspective view of a cable tray system according to one aspect of the disclosure;

DETAILED DESCRIPTION

Figure 2A:
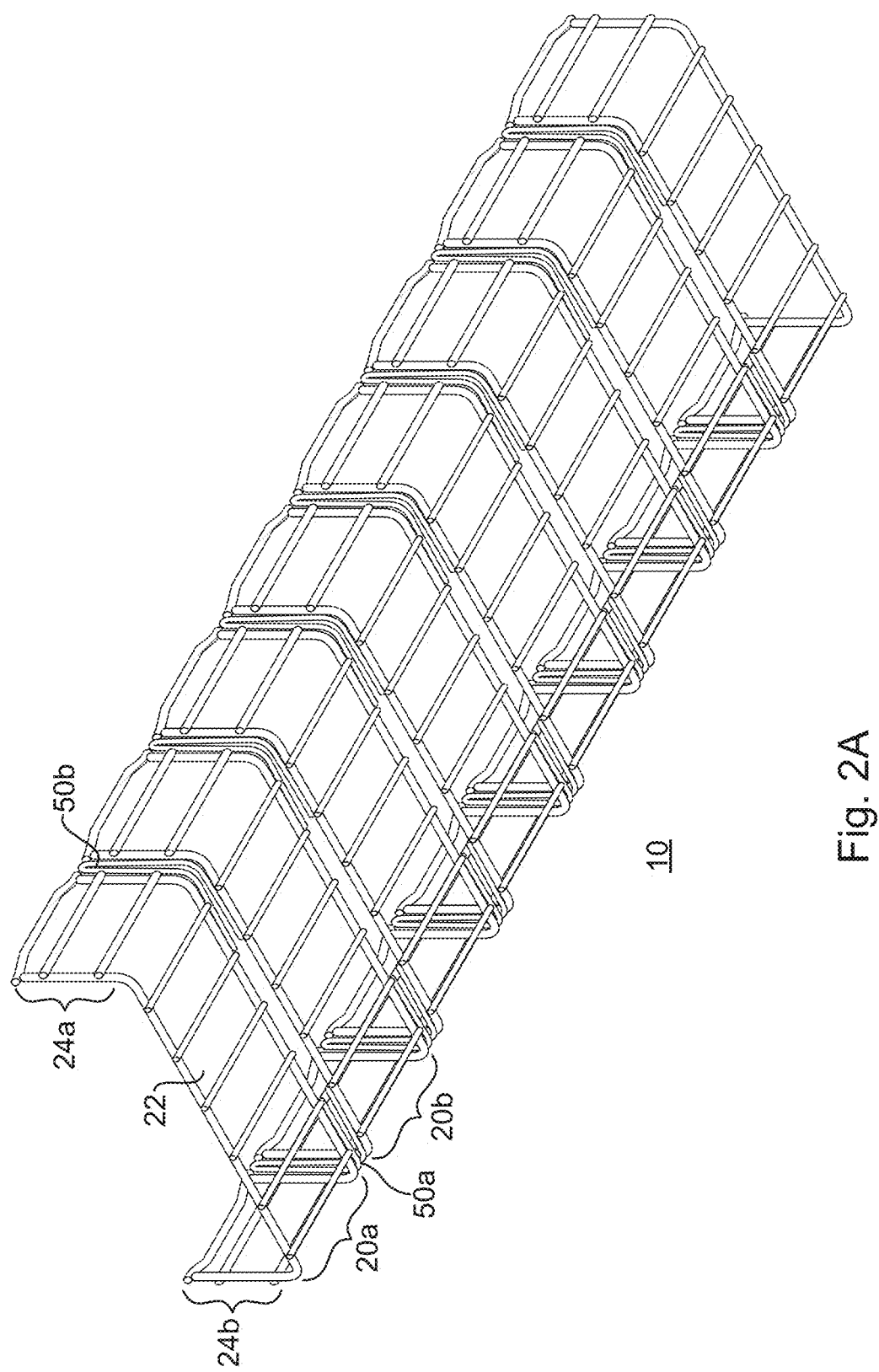
FIG. 2A is a bottom level perspective view of a cable tray system in a first position according to one aspect of the disclosure.

The accompanying figures and this description depict and describe aspects of a cable conveyance system in accordance with the present disclosure, and features and components thereof. It should also be noted that any references herein to front and back, right and left, top and bottom, iso or isometric, upper and lower are intended for convenience of description, not to limit the present invention or its components to any one positional or spatial orientation.

Before any aspects of the disclosure are explained in detail, it will be understood that the disclosure is not limited in its application to the details of construction and the arrangement of components set forth in the following description or illustrated in the following drawings. The disclosure is capable of other aspects and of being practiced or of being carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about."

Various aspects of the present disclosure are directed to a cable conveyance system for routing cables. With reference to FIGS. 1-16, an aspect of a flex-fitting tray system 10 is described in detail. As shown in FIG. 1, flex-fitting tray system 10 includes two or more tray sections 20a and 20b, each having a floor 22 on which cables routed through the system will rest. At least a portion of each floor 22 is substantially horizontal. While two tray sections 20a and 20b are depicted, in some embodiments the flex-fitting tray system 10 comprises multiple tray sections 20a, 20b.

Each tray section 20a or 20b further comprises a first side rail 12a and second side rail 12b. In some embodiments, the side rails 12a and 12b are spaced apart by a population of transverse rungs 16 extending between the first and second side rails 12a, 12b. In other embodiments, the side rails 12a and 12b are spaced apart by one or more plates (not shown). While not shown, it will be understood that flex-fitting tray system 10 may be installed on other types and/or construction of cable trays.

The population of transverse rungs 16 are spaced at intervals along the length of first and second side rails 12a, 12b, forming a ladder-like structure. In some embodiments, the rungs are spaced 2 inches from one another, while in other embodiments, the rungs may be spaced closer to one another (i.e., less than 2 inches), or further apart from one another (i.e., greater than 2 inches). In some embodiments, the rungs 16 are 4 inches wide, thus spacing the rails 12a and 12b approximately 4 inches from one another, however, the rungs can be wider or less wide, depending upon the desired dimensions of each tray section 20a or 20b. In some embodiments, wires or cables will lay length-wise in the trays system 10, such that they lay upon the side rails 12a, 12b.

In some embodiments, the tray sections 20a and 20b further comprise end pieces 25a and 25b that are affixed approximately parallel to the rungs 16. In some embodiments, the end pieces are curved or bent to accommodate and/or to provide further support for the cables. In some embodiments, end pieces 25a and 25b are spaced at a closer distance to the closest rung 16, such that the spacing is approximately the same as the spacing of the rungs 16, in other embodiments, end pieces 25a and 25b are spaced at a further distance or a closer distance than the spacing of rungs 16.

Cable and electrical wires placed in the cable tray system 10 typically rest on the floor 22 of tray sections 20a and 20b.

Rungs 16 may be tack welded to first and second side rails 12a, 12b on one or more sides of rungs 16, for example, at locations A and B. Additionally, rungs 16 may be welded to first and second side rails 12a, 12b at a plurality of locations along rails 12a and 12b. In some embodiments, rungs 16 are welded to the undersides of rails 12a and 12b. In other aspects, for example, rungs 16 may be mechanically fastened to first and second side rails 12a, 12b in a variety of ways including, but not limited to, screws, bolts, rivets, etc. instead of or in addition to welding.

The first and second side rails 12a, 12b and the transverse rungs 16 are preferably constructed of steel or an alloy thereof; however, it will be understood that any type of suitable material may be used, including, but not limited to, plastics, aluminum, stainless steel, or alloys thereof. First and second side rails 12a, 12b and transverse rungs 16 may be formed by extruding, casting, bending, or any other type of forming known in the art.

The two or more tray sections 20a and 20b of flex-fitting tray system 10 are coupled to one another or joined to one another using one or more flex-wires 50. In some embodiments (such as in FIG. 1), flex-wire 50 is in an elongated u-shape. In other embodiments (such as in FIG. 4), flex-wire 50 can have an elongated oval or square-like shape. As shown in FIG. 1, some embodiments can have multiple tray sections 20, each attached to one another by one or more flex wires 50. As such, the flex-fitted tray system is customizable.

The flex-wires 50 are flexible such that they enable the tray sections 20a and 20b to be bendable and/or moveable away from one another in a horizontal, vertical and/or radial direction. The flex-wires 50 are preferably constructed of a bendable material such as steel; however, it will be understood that any type of suitable material may be used, including, but not limited to, plastics, aluminum, stainless steel or alloys thereof. At the same time, flex-wires 50 are rigid such that they maintain the positions of the tray sections.

In some embodiments (such as in FIG. 1), flex-wires 50 are generally U-shaped and extend a length, L, wherein a first leg of the U-shaped flex-wire 50 is fastened to a first cable tray 20a and wherein a second leg of the flex-wire 50 is fastened to a second cable tray 20b. Fastening, as used herein, can be by any means, including but not limited to welding, gluing, or mechanically affixing means. In other embodiments, the flex-wires 50 can be shaped in other manners, including, but not limited to a V or W shape.

As illustrated in FIG. 1, in some embodiments, flex-wire 50 is fastened to one or more parts of a second side rail 12b of a first tray section 20a (at location X) and/or fastened to one or more parts of a first side rail 12a of a second tray section 20b (at location Y). In other embodiments, the end portion of the legs of flex-wires 50 can be bent at the ends at approximately a 90 degree angle, and the bent portion of the ends can then be fastened to one or more rungs 16, while additionally and/or alternatively the unbent leg portion can be fastened to one or more parts of a side rail 12a.

In other embodiments, and with reference to the dashed line in FIG. 1, the end portion of the legs of flex-wires 50 can be bent at the ends at approximately a 90 degree angle and the bent portions can be continuous from one flex wire 50 to the next adjacent flex wire 50, such that the 90 degree leg portion forms a rung 16 between the two side rails 12a and 12b. In other embodiments, not shown, flex-wire 50 is temporarily affixed to side rails 12a and 12b using a fastening device 60. In other embodiments, described herein with reference to FIGS. 6A and 6B, one or more of the legs of the flex-wire 50 couples to one or more of side rails 12*a* and 12*b* by hooking around the rails.

Also with reference to FIG. 1, in some embodiments, two or more tray sections 20*a* and 20*b* may be joined together by a common side rail 12, and not include any flex-wires 50 connecting the tray portions. In those such embodiments the two or more tray sections 20*a* and 20*b* may not be moveable in relation to one another.

As shown in FIG. 2A, in some embodiments, the primary tray sections 20*a* and 20*b* further includes one or more sidewalls 24*a* and 24*b* extending upwardly from and/or downwardly from, and generally perpendicularly to, the floor 22. For example, in some embodiments, the sidewalls 24*a* and 24*b* are portions of the floor 22 that have been bent vertically upward or downward from the horizontal plane of the floor 22.

For embodiments in which the primary tray sections 20*a* and 20*b* further include one or more sidewalls 24*a* and 24*b* extending vertically upward or downward from, and generally perpendicularly to, the floor 22, flex-wires 50 can be bent in an "L" shape that approximately matches the "L" shape of the bend of the sidewalls 24*a* and 24*b* from the floor 22. In other embodiments, the ends of the flex-wires may be bent at other angles less than, or greater than 90 degrees. For example, in some embodiments, the legs of the flex-wires can be bent at approximately 45 degree angles.

Figure 2B:
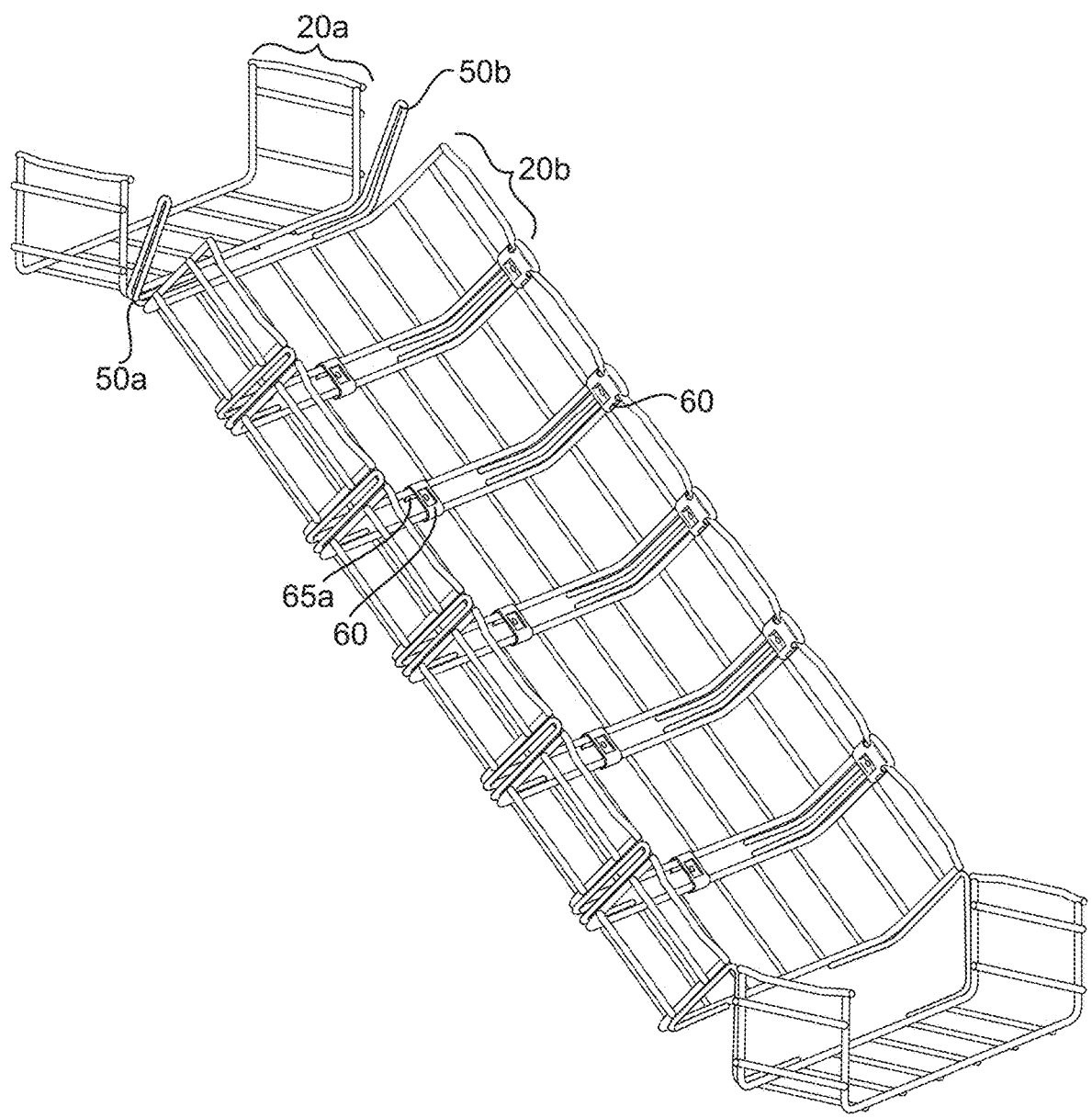
FIG. 2B is a top level perspective view of a cable tray system with portions in a rigid second position according to one aspect of the disclosure.

With reference to FIG. 2B, because flex-wires 50*a* and 50*b* are flexible, primary tray section 20*a* is moveable and/or bendable away from tray section 20*b*. That is, flex-wires 50*a* and 50*b* enable tray section 20*a* to be pulled apart from tray section 20*b* and rotated upwards or downwards from the same horizontal plane as tray section 20*b*.

Figure 3A:
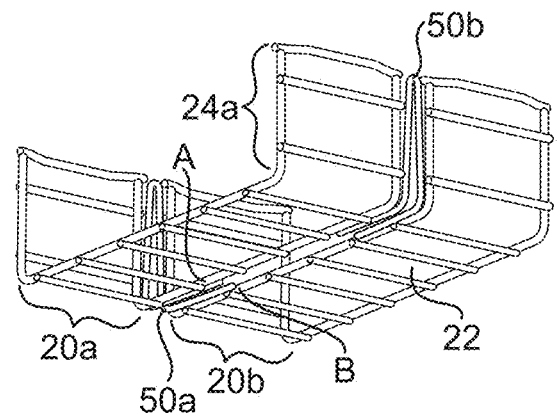
FIG. 3A is an isometric view of a cable tray system in a first position according to one aspect of the disclosure.
Figure 3B:
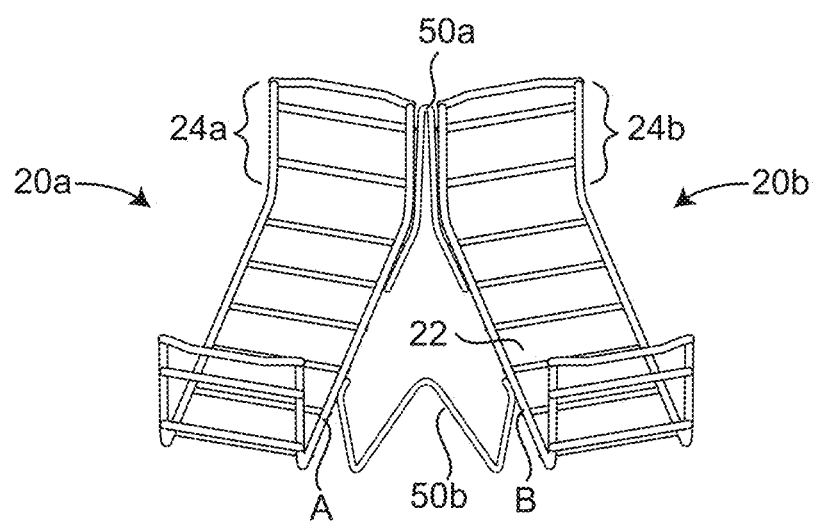
FIG. 3B is an isometric view of a cable tray system in a second position according to one aspect of the disclosure.

With reference to one embodiment illustrated in FIG. 3A and FIG. 3B, flex-wires 50*a* and 50*b* can be used to move tray sections 20*a* and 20*b* away from one another in a radial direction. For example, in some embodiments, flex-wire 50*b* may be pulled so that tray sections 20*a* and 20*b* rotate radially outward from the axis created by the intersection of the inverted "U" of flex-wire 50*a*, and the floor 22 formed by tray sections 20*a* and 20*b*. In some embodiments and with reference to FIG. 3B, flex-wires 50*a* can be moved radially outwardly away from each other, while flex wires 50*b* can be moved radially inwardly towards another such that the tray sections 20 can be moved away from one another. In some embodiments, depending upon the direction of force exerted on flex-wires 50*a* or 50*b*, tray sections 20 can also be moved away from the horizontal plane defined by the floor 22 and/or from the vertical plane defined by the sidewall 24*a*. In other embodiments (not shown), the welds at location A and B in FIG. 3A may be cut using a bolt cutter or other similar device such that only flex-wire 50*b*, and not flex-wire 50*a*, remains attached to tray sections 20*a* and 20*b*, and thus bending of flex-wire 50*b* only causes the tray sections 20 to move away from one another.

Figure 4:
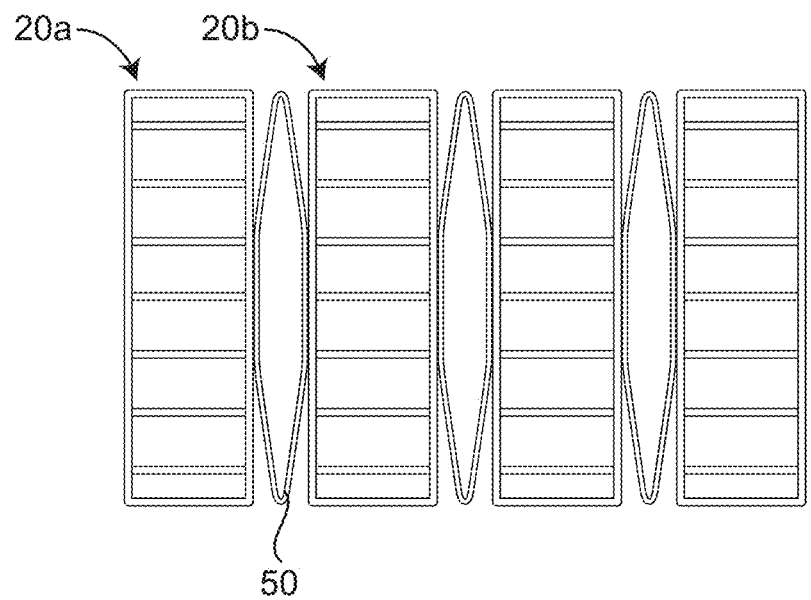
FIG. 4 is a top level plan view of a cable tray system according to one aspect of the disclosure.

While FIGS. 2A, 2B, 3A and 3B show embodiments with multiple flex-wires, in some embodiments, flex-fitting tray systems 10 comprise a single flex-wire 50 coupled to tray sections 20*a* and 20*b*. For example, with reference to FIG. 4, flex-fitting tray system 10 comprise tray sections 20*a* and 20*b* coupled to one another by a single, oval-like flex-wire 50. FIG. 4 additionally contains additional tray sections coupled by additional flex-wires.

Figure 5:
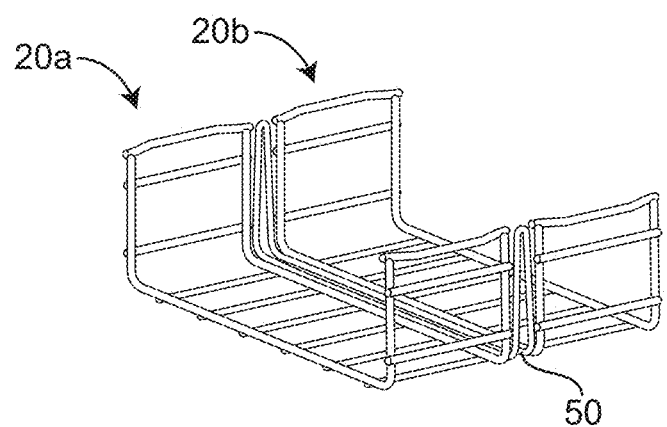
FIG. 5 is a is an isometric view of a cable tray system according to one aspect of the disclosure.

As illustrated in FIG. 5, single flex-wires 50 can also be used in tray systems 10 that have one or more bends in the trays portions 20*a* and 20*b*. In embodiments illustrated in FIGS. 4 and 5, a first side of the loop-shaped flex-wire 50 is fastened to a first cable tray and a second side of the loop-shaped flex-wire 50 is fastened to a second cable tray. The sides of flex-wire 50 can be fastened in one or more locations to tray portions 20*a* and 20*b*.

Figure 6A:
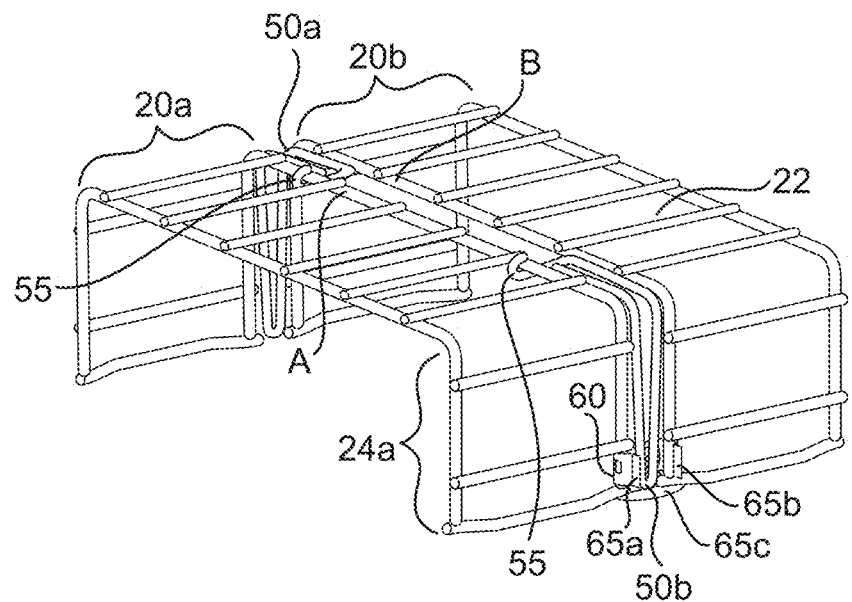
FIG. 6A is a bottom front view of a cable tray system according to one aspect of the disclosure.

With reference to FIG. 6A, in some embodiments, one or more of the legs of flex-wire 50 is shaped as a loop to couple to a side rail 12*b* or 12*a* to help secure the flex-wire 50 to the tray sections 20*a* and 20*b*. In some embodiments, the legs of flex-wire 50 (U, V, W or otherwise shaped) can be additionally fastened to side rails 12*a* and 12*b* and/or fastened to one of the side rails 12*a*, and looped around other side rail 12*b* using loop 55. In other embodiments, the legs of flex-wire 50 can be looped around both side rails 12*a* and 12*b* using loops 55.

Figure 6B:
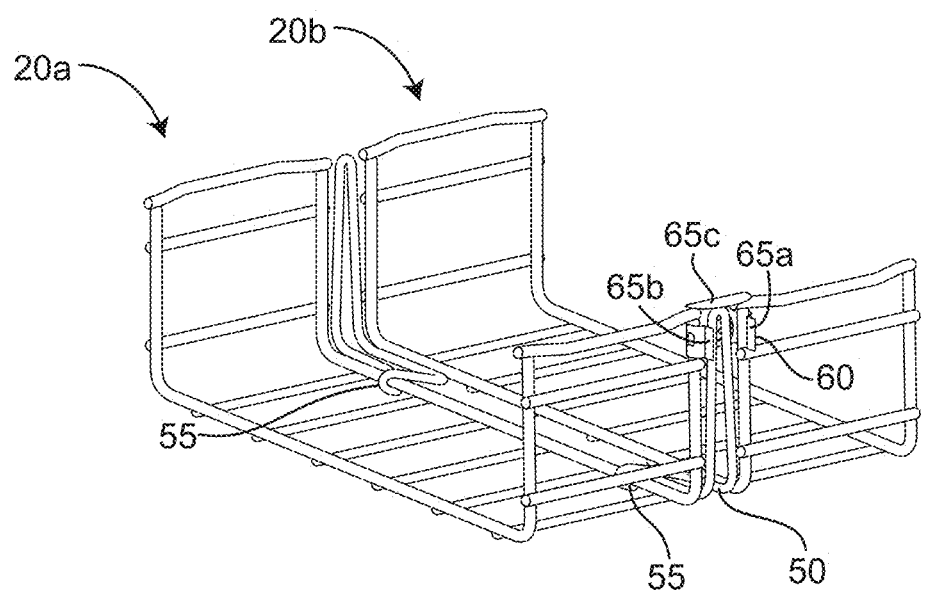
FIG. 6B is a front view of a cable tray system in a second, rigid position according to one aspect of the disclosure.

In other embodiments, with reference to FIGS. 6A and 6B, one or more fastening devices 60 can help keep flex-wire 50 rigid where needed, for example, where it is coupled to tray sections 20*a* and 20*b* in a removably lockable manner. In other embodiments, the flex-wires 50 can be coupled to side rails 12*a* and/or 12*b*, rungs 16, end pieces 24A and/or 24*b* by welding or some other fastening means. In some embodiments, due to the curved flange portions 65*a, b,* and/or c of fastening device 60, fastening device 60 can hook onto side rails 12*a* and/or 12*b*, rungs 16, end pieces 24A and/or 24*b*, and/or flex-wires 50. In other embodiments, fastening device has only one or two flange portions 65, such as on the sides of the fastening device 60, but not along the top end of fastening device 60. In some embodiments, where flex-wire 50 does not include a loop 55, fastening devices 60 can be further secured to side rails 12*a* and/or 12*b*, rungs 16, end pieces 24A and/or 24*b*, and/or flex-wires 50 with a pair of pliers or some other means. In some embodiments, fastening devices 60 can be a Faslock clip sold by Cablofil, including, but not limited to a Faslock Auto clip, a Faslock Auto S clip, and/or a Faslock Auto XL clip. Fastening device 60 can be made of electrozinc, hot dip galvanized, stainless steel 316L or other suitable metal or plastic materials. Fastening devices 60 are removably lockable and can be released from tray system 10 by twisting them or using pliers or some other means.

In some embodiments, fastening device 60 is positioned on the internal angle of a radius bend after flex-wire 50 has been cut or bent and tray portion 20*a* has been radius away from tray portion 20*b* (not shown). In such cases, fastening device 60 locks the tray system 10 into a rigid second position.

It should be noted that in FIGS. 1 and 4, the cable tray system 10 is shown in a flat condition existing during manufacturing and that the cable tray system 10 herein disclosed is designed to be marketed in an original condition shown in FIGS. 2A, 3A, 5, 6A, 6B and 7 to 16.

In the original condition, the cable tray system 10 is channel shaped with a floor 22 and two sidewalls 24*a*, 24*b* each extending from the floor 22 and facing each other.

The transition between the flat condition and the original condition is done during manufacturing, as mentioned above by bending on either side the cable tray system in flat condition.

In the drawn examples the cable tray sections 20*a*, 20*b* and the flex-wires 50 are made of the same metal wire which is relatively rigid but permanently deformable (in other word: bendable) if a sufficiently strong bending effort is exerted onto them.

Each cable tray section 20*a*, 20*b* has a relatively strong resistance to deformation because of the mesh arrangement of the wires it is made of.

Each flex-wire 50 has a comparatively lower resistance to deformation because it is arranged as a single wire not meshed with other wires.

This is why two neighboring cable tray sections 20a, 20b can move away from one another as disclosed above through deformation of the flex-wire or flex-wires 50 which couples the neighboring cable tray sections 20a, 20b.

The disclosed cable tray system can thus, through deformation of the flex-wires 50, take very diverse operative conditions that enables to connect conventional cable trays that are not aligned with one another.

For instance, in the operative condition shown on FIG. 2B, the cable tray system enables to connect two conventional cable trays which are oriented along the same direction but at different levels: the higher conventional cable tray can be connected to the end of the cable tray system seen on the left on FIG. 2B and the lower conventional cable tray can be connected to the end of the cable tray system seen on the right on FIG. 2B.

Still for instance, in the operative condition shown on FIG. 3B, the cable tray system enables to connect two conventional cable trays which are at the same level and oriented along different directions.

It should be noted that in the original condition of the cable tray system illustrated on the drawings, each of the first leg and the second leg of the flex-wire 50 is bent in an "L" shape that approximately matches the "L" shape of the bend of the sidewalls from the floor of the cable tray sections; and that each of the flex-wires 50 has a bridge 73 (FIG. 7) connecting the first leg and the second leg, the portion of the flex-wire 50 between two neighboring sidewalls 24a, 24b having the shape of an hairpin.

In the operative condition of which examples are shown on FIGS. 2B and 3B, the cable tray sections 20a and 20b keep the same shape or substantially the same shape as in the original condition whereas the flex-wires 50 are deformed with respect to the original condition.

For changing the configuration of the cable tray system illustrated on the drawings, in particular from the original condition to an operative condition, the operator exerts efforts on neighboring cable tray sections 20a and 20b so as to deform the flex-wire or flex-wires 50 between them.

It should be noted that the arrangement of the flex-wire 50 in the original condition, namely in two legs each having an L profile with a first leg extending along the side rail 12b of the cable tray section 20a and a second leg extending along the side rail 12a of the neighboring cable tray section 20b, with a bridge 73 at the top of the flex-wire 50 such that the portion of the flex-wire 50 between two neighboring sidewalls 24a, 24b has the shape of an hairpin, is very advantageous because it is relatively easily deformable in very diverse ways, as shown on FIGS. 2B and 3B, while still keeping a profile favorable to the holding of the cables or the like accommodated within the cable tray system.

It should be noted that in the illustrated examples, in the original condition of the cable tray system the flex-wire 50 extends along the entire height of the sidewalls 24a, 24b, the bridge 73 being located at the level of end piece 25a or 25b.

Figure 7:
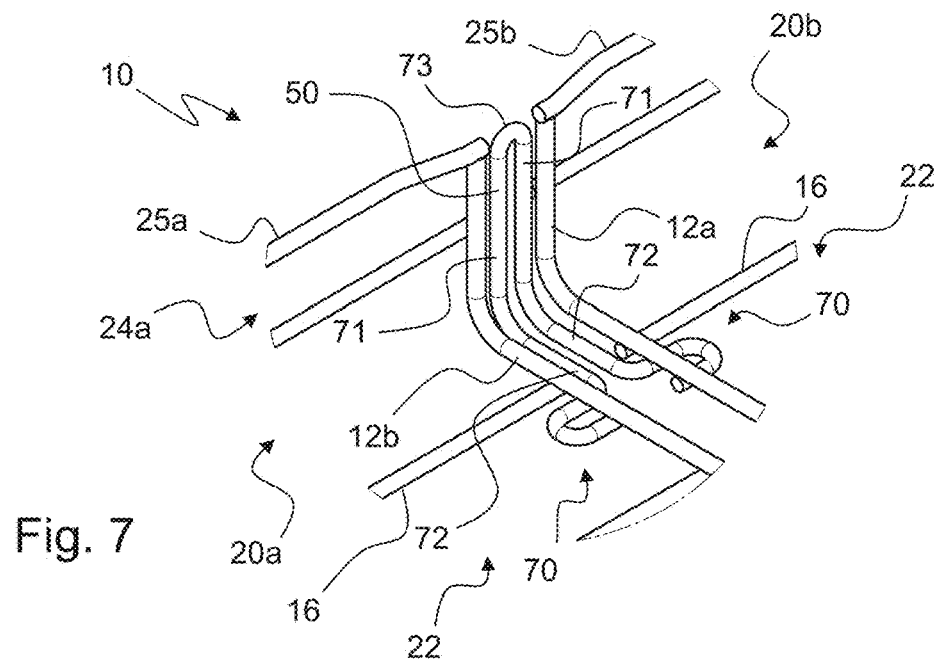
FIG. 7 is a perspective view of a portion of one embodiment of a cable tray system in an original condition, showing two neighboring cable tray sections and the flex-wire between them seen from inside the cable tray system.
Figure 8:
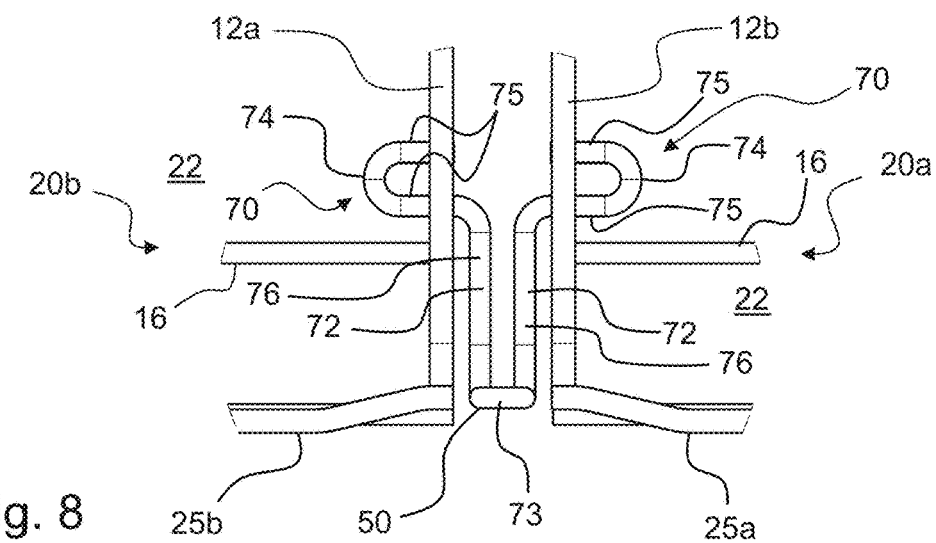
FIG. 8 is a top view of the same portion of the one embodiment.
Figure 9:
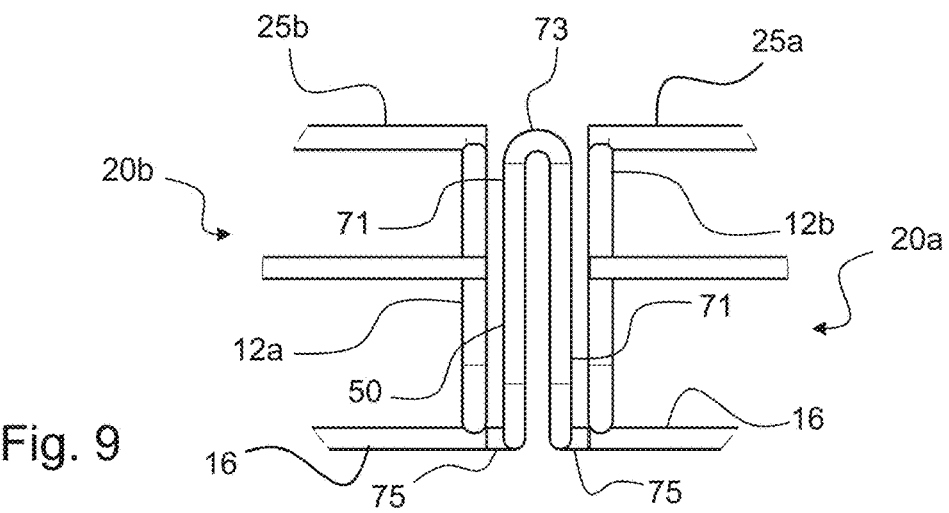
FIG. 9 is an elevation view of the same portion of the one embodiment, seen from outside.

The cable tray system 10 illustrated on FIGS. 7 to 9 is similar to the one illustrated on FIGS. 2A to 3B except that the flex-wire 50 is shaped differently.

More specifically, each of the first leg and the second leg of the flex-wire 50 has a C-shaped end portion 70 welded to the side rail 12b of the first tray section 20a and to the side rail 12a of the second tray section 20b respectively.

The first leg and the second leg are arranged mirroring each other so that any description of the first leg and the first tray section 20a in the present memorandum applies mutatis mutandis to the second leg and second tray section 20b.

For having the above mentioned "L" shape, the first leg has an upright portion 71 extending from the bridge 73 and having substantially the same orientation as the sidewalls 24a, 24b, and a lying portion 72 extending from upright portion 71 and having substantially the same orientation as the floors 22.

The lying portion 72 has a base portion 76 extending from the upright portion 71, along the side rail 12b, up to the C-shaped end portion 70.

The base portion 76 is located between the first and second tray sections 20a and 20b. The C-shaped end portion 70 projects laterally from the base portion 76 towards and beyond the side rail 12b.

The C-shaped end portion 70 has a bottom 74 and two branches 75 each extending from a respective side of the bottom 74 towards the side rail 12b. Each branch 75 is welded to the side rail 12b. Here, there is no weld or other fastening between the base portion 76 and the side rail 12b, so that the entire length of the base portion 76 can deform when transitioning from the original condition to the operative condition.

Here the base portion 76 is connected to the branch 75 which is the closest to the upright portion 71.

Figure 14:
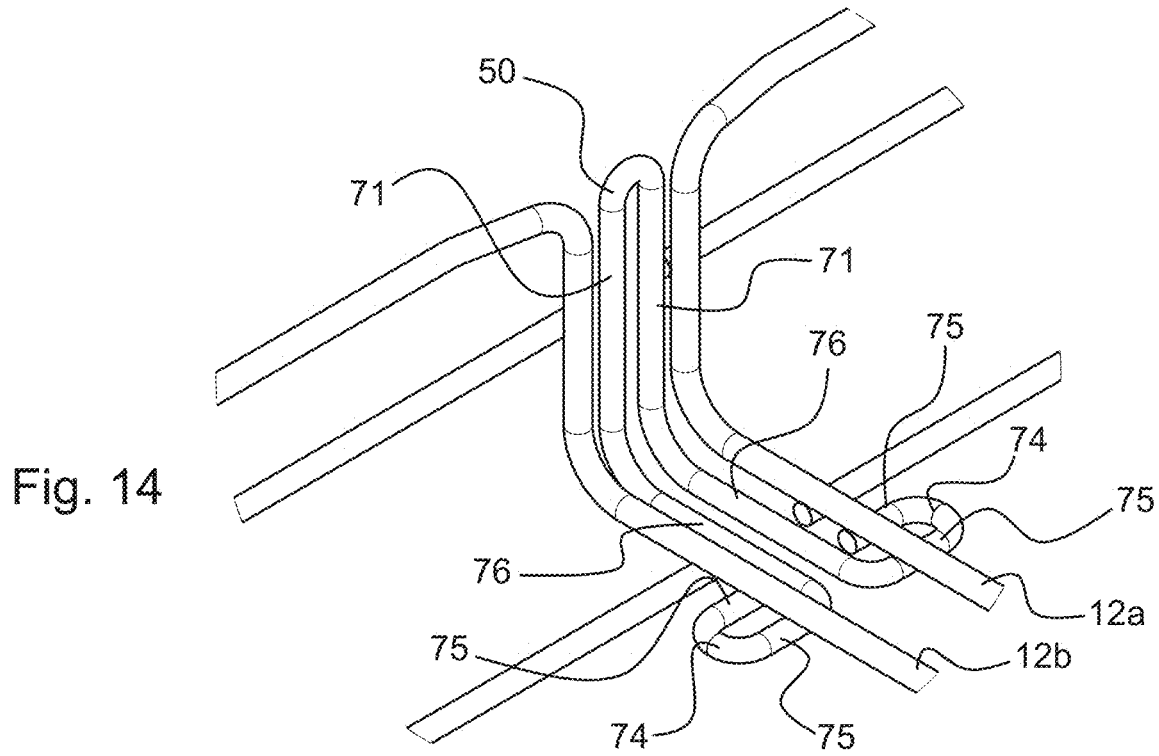
FIG. 14 is a view similar to FIG. 7 or FIG. 10 but for a variant of the one further embodiment of the cable tray system in original condition.

In a variant illustrated on FIG. 14, the base portion 76 is connected to the branch 75 which is the furthest to the upright portion 71.

This variant offers the advantage of maximizing the length of the base portion 76 and thus of optimizing the deformation capability of the flex-wire 50.

Turning back to the embodiment illustrated on FIGS. 7 to 9, it can be seen that the base portion 76 and the C-shaped end portion 70 are both entirely at the same level as the floor rungs 16.

Figure 10:
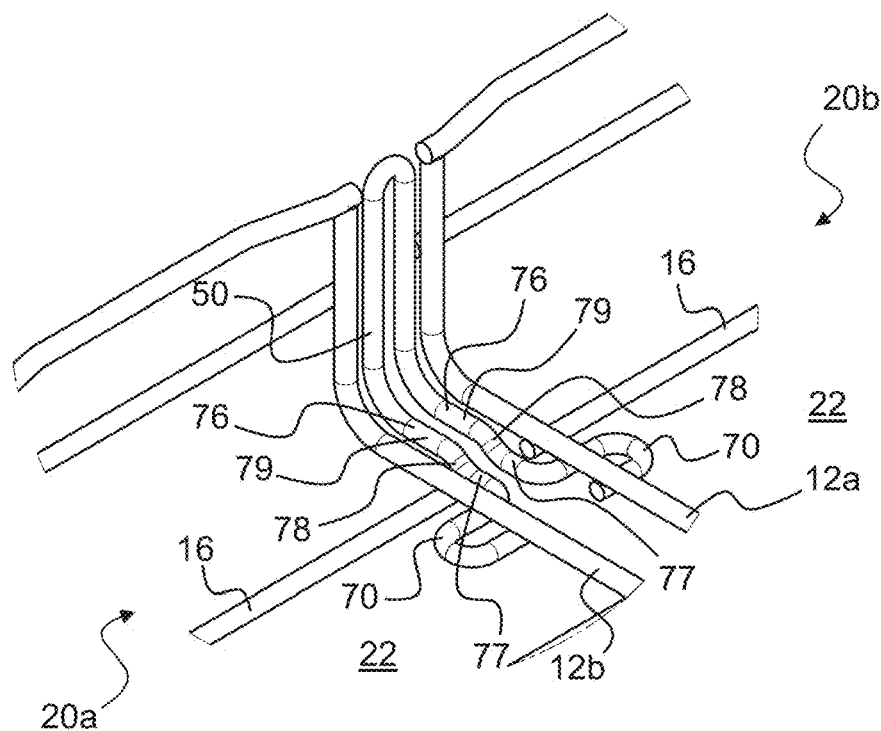
FIGS. 10 to 12 are similar to FIGS. 7 to 9, but for a variant of the one embodiment of the cable tray system.
Figure 11:
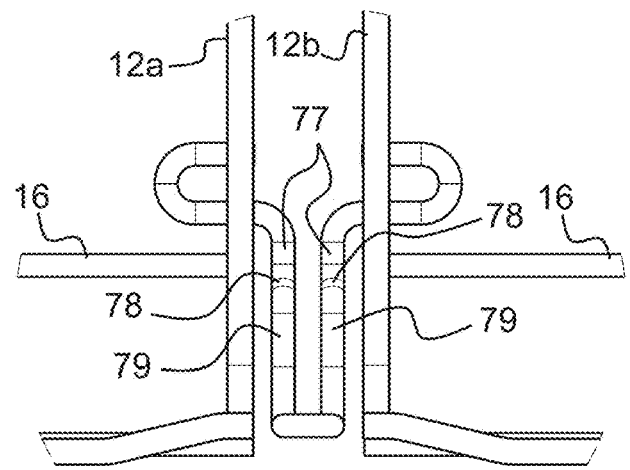
Figure 12:
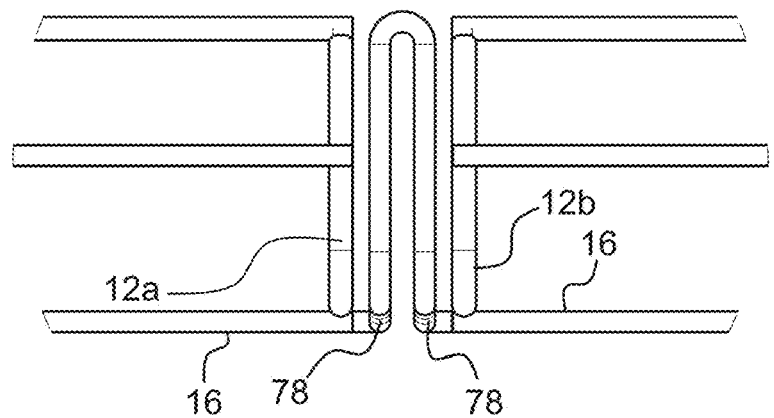
Figure 13:
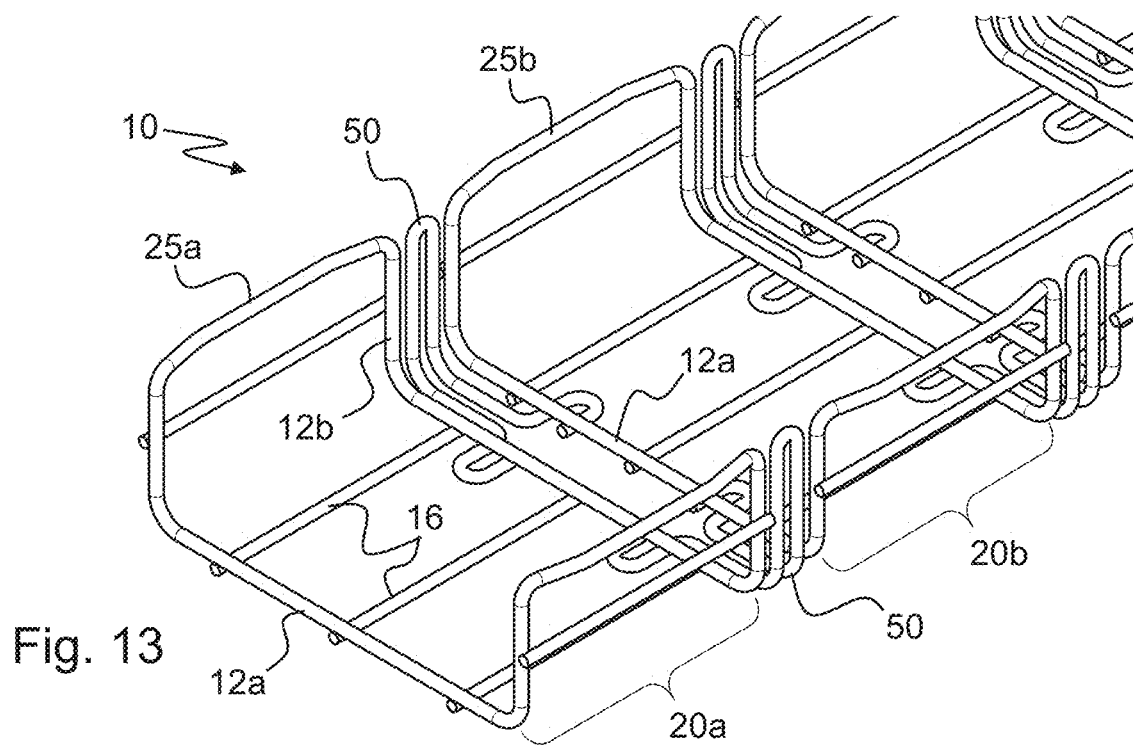
FIG. 13 is a perspective view of one further embodiment of a cable tray system in original condition.

In a variant illustrated on FIGS. 10 to 12, the base portion 76 is only partially at the same level as the rungs 16.

More specifically, in this variant the base portion 76 comprises a low portion 77 extending from the C-shaped end portion 70 and at the same level as the rungs 16, a high portion 79 extending from the upright portion 71 and at the same level as the portion of the side rail 12a belonging to the floor 22, and a transition portion 78 connecting the high portion 79 and the low portion 77.

FIGS. 13 to 16 illustrate further embodiments of the cable tray system in which the end pieces 25a, 25b and the side rails 12a, 12b of each tray section 20a, 20b are integrally formed, namely in the continuity of one another. In such embodiments, the end pieces 25a, 25b and the side rails 12a, 12b may be formed from a single wire which is bent at each junction between an end piece 25a, 25b and a side rail 12a, 12b.

This offers the advantage of providing soft junctions between the end pieces 25a, 25b and the side rails 12a, 12b. Such soft junctions minimize the risk of damaging the cables or the like accommodated within the cable tray system.

Figure 15:
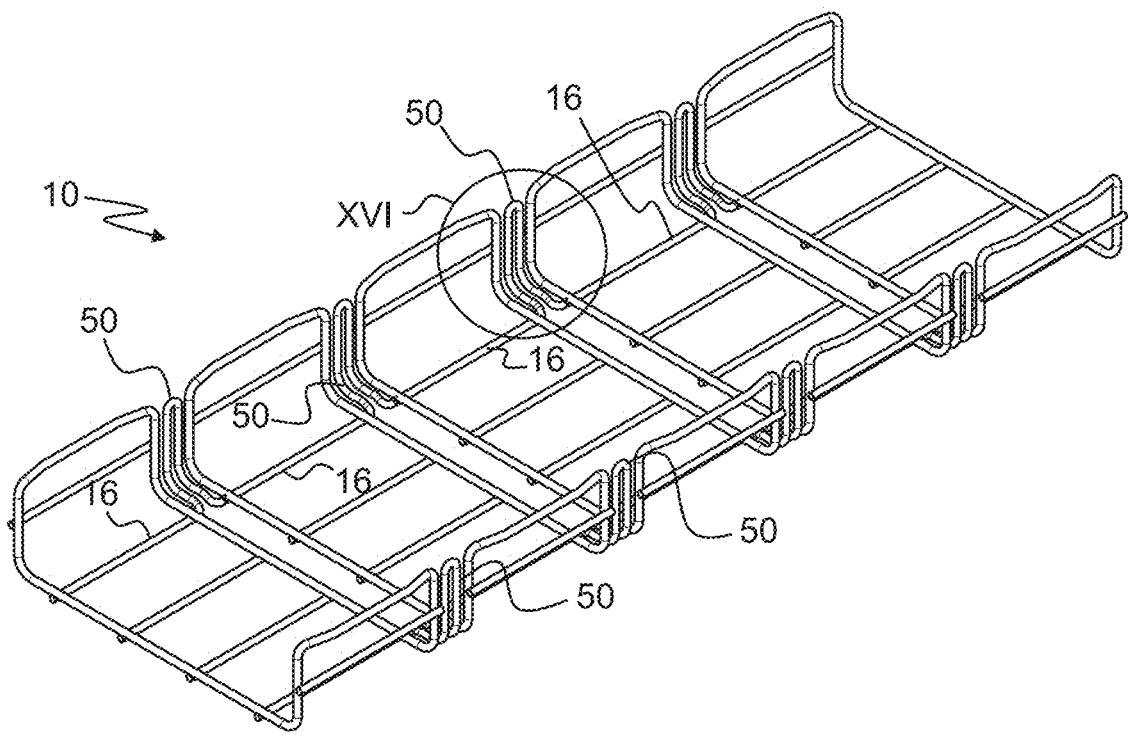
FIG. 15 is a view similar to FIG. 13 but for one still further embodiment of a cable tray system in original condition.
Figure 16:
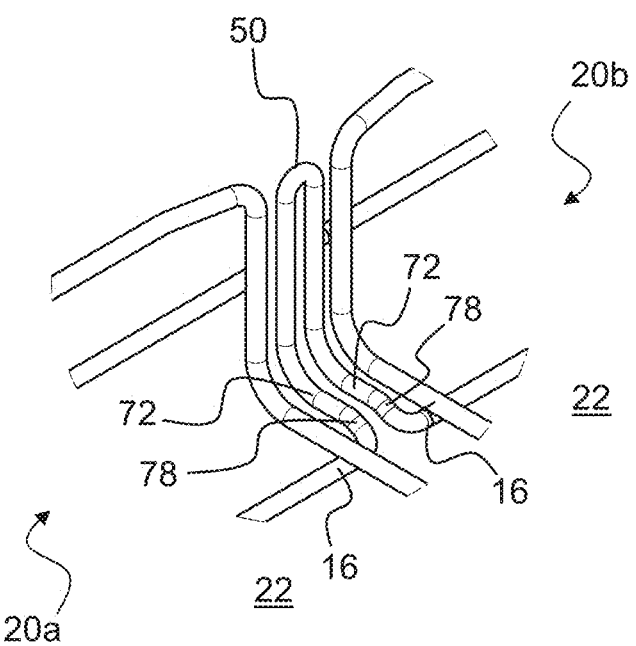
FIG. 16 is an enlargement of the portion of FIG. 15 shown by XVI.

FIGS. 15 and 16 illustrate one of these further embodiments of the cable tray system 10 in which the flex-wire 50 is identical to the one illustrated on FIGS. 10 to 12 except that the first leg is devoid of a C-shaped end portion 70 and that the lying portion 72, here more specifically the transition portion 78 thereof, is directly connected to a rung 16 of the tray section 20a. Here the flex-wire 50 and rung 16 are integrally formed, namely in the continuity of one another.

In the embodiment illustrated on FIGS. 15 and 16, the floor rung 16 to which is connected the flex-wire 50 is the closest to the sidewall 24a, 24b. In variants, this is another floor rung 16, for instance the second as from the sidewall 24a, 24b as in the embodiment illustrated by the dashed line in FIG. 1.

Thus, there has been shown and described a novel cable tray system including a flexible-wire, which overcomes many of the problems of the prior art. It will be apparent, however, to those familiar in the art, that many changes, variations, modifications, and other uses and applications for the subject devices and methods are possible. All such changes, variations, modifications, and other uses and applications that do not depart from the spirit and scope of the disclosure are deemed to be covered by the disclosure which is limited only by the claims which follow.

What is claimed is:

1. A cable tray system comprising two or more rigid cable tray sections (20a, 20b) coupled by one or more flex-wires (50), wherein:
   (A) each cable tray section (20a, 20b) comprises a first side rail (12a) and a second side rail (12b) arranged substantially parallel to one another and a floor (22) extending between and connecting the first and second side rails (12a, 12b); wherein each of the cable tray sections (20a, 20b) has one or more sidewalls (24a, 24b) extending vertically upward or downward from, and generally perpendicularly to, the floor (22) of the cable tray sections;
   (B) each flex-wire (50) extends a length, L, or is loop-shaped, wherein a first leg or side of the flex-wire (50) is coupled to a first cable tray section (20a) and wherein a second leg or side of the flex-wire (50) is coupled to a second cable tray section (20b); wherein each flex-wire (50) is bent in an "L" shape that approximately matches the "L" shape of the bend of the one or more sidewalls (24a, 24b) from the floor (22) of the cable tray sections (20a, 20b); wherein, upon exerting tension on the one or more flex-wires (50), the first and second cable tray sections (20a, 20b) move away from one another from a first position to a second position.

2. The cable tray system of claim 1, further comprising a removable fastening device (60; 55) coupled to the two or more cable tray sections (20a, 20b) to minimize flexibility of the two or more cable tray sections (20a, 20b), relative to one another, when coupled.

3. The cable tray system of claim 1, further comprising a removable fastening device that locks at least a portion of the cable tray system (10) into the second position, keeping at least a portion of the cable tray system into the first position.

4. The cable tray system of claim 1, wherein the first leg or side of the flex-wire (50) is coupled to the first cable tray section (20a) by one of a weld or a looped end of the first leg and wherein the second leg or side of the flex-wire (50) is coupled to the second cable tray section (20b) by one of a weld or a looped end of the second leg.

5. The cable tray system of claim 1, wherein upon exerting tension on the flex-wire (50), the first cable tray section (20a) moves away from the second cable tray section (20b) from a first position to a second position in one or two of a substantially upwards, downwards and radial direction, or any combination of upwards, downwards or radial direction.

6. The cable tray system of claim 2, wherein the second leg of the flex-wire (50) is coupled to the first cable tray section (20a) by a looped end (55) of the second leg that encircles a portion of the first cable tray section (20a).

7. The cable tray system of claim 1, wherein the one or more flex-wires (50) are one of U-, V- or W-shaped.

8. The cable tray system of claim 1, wherein the cable tray system (10) is in an original condition in which it is channel shaped with a floor (22) and two sidewalls (24a, 24b) each extending from the floor (22) and facing each other.

9. The cable tray system of claim 8, wherein upon exerting efforts on the first cable tray section (20a) and on the second cable tray section (20b) the one or more flex-wires (50) between them deform so that the cable tray system (10) transitions to an operative condition.

10. The cable tray system of claim 1, wherein the cable tray system (10) is in an original condition in which the one or more flex-wires (50) has an L profile with a first leg extending along one of the side rails (12a, 12b) of the first cable tray section (20a) and a second leg extending along one of the side rails (12a, 12b) of the second cable tray section (20b), with a bridge (73) at a top of the one or more flex-wires (50) such that a portion of the one or more flex-wires (50) between one of the sidewalls (24a, 24b) of the first cable tray section (20a) and one of the sidewalls (24a, 24b) of the second cable tray sections (20b) has a shape of a hairpin.

11. The cable tray system of claim 10, wherein the one or more flex-wires (50) extends substantially along an entire height of the one of the sidewalls (24a, 24b) of the first cable tray section (20a) and the one of the sidewalls (24a, 24b) of the second cable tray sections (20b).

12. The cable tray system of claim 10, wherein at least one of the first leg and the second leg of the one or more flex-wires (50) has a C-shaped end portion (70) welded to the side rail (12a, 12b) along which the at least one of the first leg and the second leg extends.

13. The cable tray system of claim 10, wherein the at least one of the first leg and the second leg has: (i) an upright portion (71) extending from the bridge (73) and having substantially the same orientation as the one of the sidewalls (24a, 24b) of the first cable tray section (20a) and the one of the sidewalls (24a, 24b) of the second cable tray section (20b) and (ii) a lying portion (72) having substantially the same orientation as the floors (22) of the first cable tray section (20a) and second cable tray section (20b); wherein the lying portion (72) has a base portion (76) extending between the upright portion (71) and the C-shaped end portion (70); wherein the C-shaped end portion (70) projects laterally from the base portion (76) towards and beyond the side rail (12a, 12b) along which the at least one of the first leg and the second leg extends.

14. The cable tray system of claim 13, wherein the C-shaped end portion (70) is at a same level as floor rungs (16) extending between the side rails (12a, 12b) of the cable tray sections (20a, 20b), the base portion (76) comprises a low portion (77) extending from the C-shaped end portion (70) and at the same level as the floor rungs (16), a high portion (79) extending from the upright portion (71) and at a same level as the portion of the side rail (12a, 12b) along which the at least one of the first leg and the second leg extends, and a transition portion (78) connecting the high portion (79) and the low portion (77).

15. The cable tray system of claim 1, wherein each of the first cable tray section (20a) and second cable tray section (20b) comprises rungs (16) extending between the first side rail (12a) and the second side rail (12b) and further comprises end pieces (25a, 25b) oriented as the rungs (16) and extending from one end of the first side rail (12a) to one end of the second side rail (12b), wherein each end pieces (25a, 25b) is integrally formed with the first side rail (12a) and the second side rail (12b).

* * * * *